United States Patent
Madaiah

(10) Patent No.: US 9,596,112 B2
(45) Date of Patent: Mar. 14, 2017

(54) METHOD FOR COMMUNICATION VIA THREE ORTHOGONAL WAVEFORMS

(71) Applicant: Tejas Networks Ltd., Bangalore (IN)

(72) Inventor: Vinod Kumar Madaiah, Bangalore (IN)

(73) Assignee: TEJAS NETWORKS LTD. (IN)

( * ) Notice: Subject to any disclaimer, the term of this patent is extended or adjusted under 35 U.S.C. 154(b) by 0 days.

(21) Appl. No.: 14/882,295

(22) Filed: Oct. 13, 2015

(65) Prior Publication Data
US 2016/0105302 A1    Apr. 14, 2016

(30) Foreign Application Priority Data
Oct. 14, 2014   (IN) .......................... 5154/CHE/2014

(51) Int. Cl.
| | |
|---|---|
| H04L 27/36 | (2006.01) |
| H04L 27/26 | (2006.01) |
| H04L 27/34 | (2006.01) |
| H04L 23/02 | (2006.01) |

(52) U.S. Cl.
CPC .......... H04L 27/2601 (2013.01); H04L 23/02 (2013.01); H04L 27/34 (2013.01)

(58) Field of Classification Search
CPC ... H04L 27/34; H04L 27/362; H04L 27/2601; H04L 23/02
USPC ............................................ 375/298; 14/298
See application file for complete search history.

(56) References Cited

U.S. PATENT DOCUMENTS

2011/0200337 A1*  8/2011  Karout ................ H04B 10/516
                                                            398/141

* cited by examiner

*Primary Examiner* — Janice Tieu
(74) *Attorney, Agent, or Firm* — Knobbe, Martens, Olson & Bear, LLP

(57) ABSTRACT

Aspects of the present disclosure aim at providing three orthogonal waveforms that can be used for transmitting 3n bits (n bits from each waveform) at a given frequency. Such three orthogonal waveforms can be used in applications such as QAM to create a 3-dimensional QAM, along with use in other like applications such as in Orthogonal frequency-division multiplexing (OFDM), Quadrature Phase Shift Keying (QPSK), Binary Phase Shift Keying (BPSK), among others. In an aspect, a method of the present disclosure includes a step of generating three orthogonal waveforms as $\cos(\theta)+k$, $\cos(\theta+2\pi/3)+k$, and $\cos(\theta+4\pi/3)+k$, where k is the DC component and can have a value of 0.5 volts, and $\theta=2\pi ft$ with f being the (baseband or passband) frequency=1/T, with T being Time Period, and t being time. Cosine waveforms can be equivalently replaced by sine waveform separated by 120 degrees.

9 Claims, 4 Drawing Sheets

METHOD FOR COMMUNICATION VIA THREE ORTHOGONAL WAVEFORMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of Invention

Embodiments of the present disclosure generally relate to generation of three orthogonal waveforms. In particular, the present disclosure relates to generation of three orthogonal waveforms to be used in any circuit including but not limited to OFDM, QAM, among others where complex number algebra is used.

Description of the Related Art

The background description includes information that may be useful in understanding the present invention. It is not an admission that any of the information provided herein is prior art or relevant to the presently claimed invention, or that any publication specifically or implicitly referenced is prior art.

In any modulation scheme employing in-phase and quadrature-phase components, the transmitted modulation signal over a period of duration T may be represented by the expression $M(t)=A*\cos(2pi*t/T)+B*\sin(2pi*t/T)$, or as a similar sum of an alternate pair of orthogonal waveforms. The period T is known as a symbol period, and $1/T$ is defined to be the frequency (baseband or passband) or baud rate, FB. Data is communicated by selecting during each symbol period one of a limited number of permissible (A, B) vectors or symbols. Various such quadrature modulation schemes differ in the number, N, of possible symbols and the relative values of the (A, B) vectors corresponding to each possible symbol. Generally, the number, N, of possible symbols is an integer power of 2. Each transmitted symbol then communicates a unique string of $\log_2 N$ bits.

A signal constellation is a graphical representation of the possible symbols for a given modulation scheme. The horizontal and vertical axes correspond to the orthogonal components of the modulation signal. Each possible symbol is represented by a point at the position of its associated (A, B) coordinates. A 64 point QAM can for instance be represented as an array of 64 points. Since $\log_2(64)=6$, the choice of one particular symbol for transmission during a given symbol period communicates six bits of information. Typically, the bits of information communicated per dimension or axes are equal, which in this example is three bits per axes.

Many other signal constellations are possible. For example, other variants of QAM also have array signal constellations but with various numbers of points. For QPSK (quadrature phase shift key) modulation, the four points of the signal constellation are arranged in a circle having the origin as a center.

QAM transmissions consist of modulating two signals on orthogonal carriers (such as a sine and a cosine carrier) and combining them on the same transmission channel. Since the carriers are orthogonal, the receiver may recover the two transmitted signals by demodulating the incoming signal with identical sine and cosine carriers. This method of modulation allows twice as much data to be transmitted on a given channel as a standard Amplitude Modulation (AM) approach. In Quadrature Amplitude Modulation (QAM), the signal point is a complex number having a real component and an imaginary component, wherein the real component of the signal is transmitted through Cosine waveform, and the imaginary component is transmitted using Sine waveform, wherein Sine and Cosine are orthogonal waveforms.

Existing systems therefore allow variable use of four different symbol signal spaces having 8, 16, 32, and 64 transmit points (corresponding to 3, 4, 5 or 6 bits per symbol respectively). In an aspect, if the Sine waveform transmits n bits and Cosine waveform also transmits n bits, the total transmission takes place of 2n bits. In a 16 QAM, Sine wave can transmit 2 bits and Cosine waveform can transmit 2 bits, making it a total of 4 bits being transmitted in one unit of transmission time interval. Similarly, in a 64 QAM, Sine wave will transmit 3 bits and Cosine waveform will transmit 3 bits, making it a total of 6 bits that can be transmitted in one unit of transmission time interval. It may however be desired to send more bits per unit of transmission time interval, which in the current system is restricted to 2n by means of two available orthogonal waveforms.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

SUMMARY

It is an object of the present disclosure to provide a mechanism/system that enables sending of more bits per unit of transmission time interval.

It is an object of the present disclosure to provide a mechanism/system that provides three orthogonal waveforms that can be used for transmitting 3n bits (n bits from each waveform) at a given frequency.

It is an object of the present disclosure to provide a mechanism/system that provides three orthogonal waveforms to enable use of such three orthogonal waveforms in applications such as QAM to create a 3-dimensional QAM, along with use in other like applications such as in Orthogonal frequency-division multiplexing (OFDM), Quadrature Phase Shift Keying (QPSK), Binary Phase Shift Keying (BPSK), among others.

It is an object of the present disclosure to provide a mechanism/system that provides three orthogonal waveforms to enable implementation in applications where complex number algebra is used, which can help increase the transmission capacity by additional 50%.

Aspects of the present disclosure aim at providing three orthogonal waveforms that can be used for transmitting 3n bits (n bits from each waveform) at a given frequency. Use of such three orthogonal waveforms can be used in applications such as QAM to create a 3-dimensional QAM, along with use in other like applications such as in Orthogonal frequency-division multiplexing (OFDM), Quadrature Phase Shift Keying (QPSK), Binary Phase Shift Keying (BPSK), among others. The three orthogonal waveforms can in general be used in any application where complex number algebra is used, and can help increase the transmission capacity by additional 50%.

According to one embodiment, method of the present disclosure includes the step of generating three orthogonal waveforms as $\cos(\theta)+k$, $\cos(\theta+2\pi/3)+k$, and $\cos(\theta+4\pi/3)+k$, wherein k is the DC component having a value of say 0.5 volts, and $\theta=2\pi ft$ with f being the baseband frequency=1/T with T being Time Period, and t being time. It is obvious that these Cosine waveforms can be equivalently replaced by Sine waveform separated by 120 degrees.

In an aspect therefore, the present disclosure relates to a method comprising the step of generating three orthogonal waveforms as $\cos(\theta)+k$, $\cos(\theta+2\pi/3)+k$, and $\cos(\theta+4\pi/3)+k$, wherein k represents DC component of the waveforms, and wherein $\theta=2\pi ft$ with f being baseband frequency=1/T, and T being Time Period, and t being time.

In an aspect, the cosine waveforms can be replaced by sine waveforms separated by 120 degrees, and wherein the three orthogonal waveforms can be used for transmitting 3n bits at a given frequency, wherein n bits are transmitted from each waveform. In another aspect, the three orthogonal waveforms can be used in any or a combination of QAM to create a 3-dimensional QAM, Orthogonal frequency-division multiplexing (OFDM) based modulation, Quadrature Phase Shift Keying (QPSK) based modulation, Binary Phase Shift Keying (BPSK) modulation, and a complex number algebra based modulation technique.

In an aspect, the present disclosure relates to a method comprising the steps of generating three phase shifted waveforms, and generating three orthogonal waveforms by adding Direct Current (DC) component to each of the three phase shifted waveforms of the same transmission frequency f, wherein the waveforms are sinusoidal or co-sinusoidal. Aspects of the present disclosure aim at providing three orthogonal waveforms that can be used for transmitting or communicating 3n bits (n bits from each waveform) at a given frequency. Use of such three orthogonal waveforms can be used in applications such as QAM to create a 3-dimensional QAM, along with use in other like applications such as in Orthogonal frequency-division multiplexing (OFDM), Quadrature Phase Shift Keying (QPSK), Binary Phase Shift Keying (BPSK), among others. The three orthogonal waveforms can in general be used in any application where complex number algebra is used, and can help increase the transmission capacity by additional 50%.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
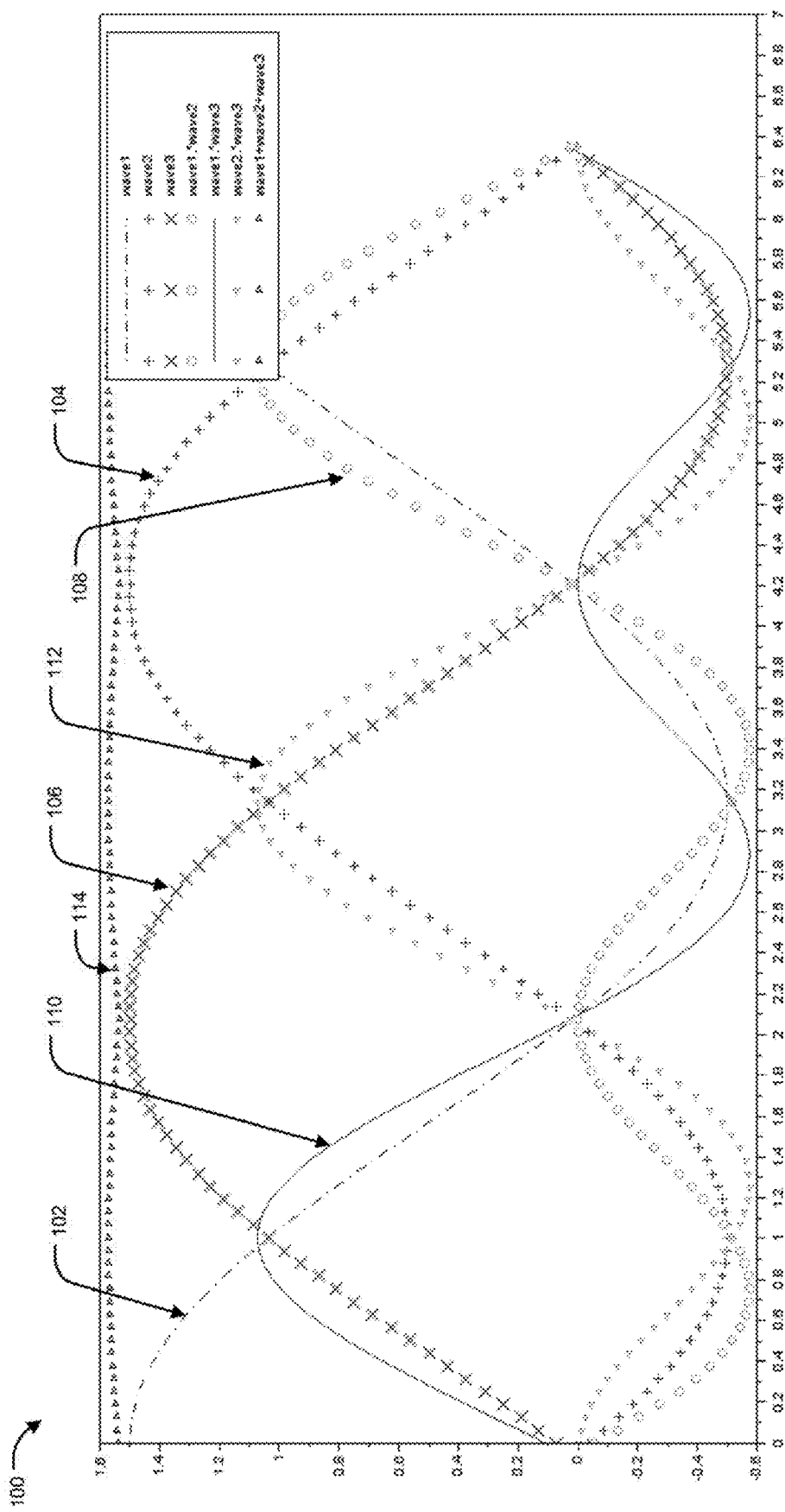
FIG. 1 illustrates an exemplary graphical plot showing orthogonality of the proposed waveforms in accordance with an embodiment of the present disclosure.

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of generating three orthogonal waveforms, it should be appreciated that the same has been done merely to illustrate the disclosure in an exemplary manner and any other purpose or function for which the explained structure or configuration can be used, is within the scope of the present disclosure.

Exemplary embodiments will now be described more fully hereinafter with reference to the accompanying drawings, in which exemplary embodiments are shown. This disclosure may, however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). For example, one can have three generalized waveforms as below $$\cos(2\pi ft)+k \quad (1)$$

$$\cos(2\pi ft+\alpha)+l \quad (2)$$

$$\cos(2\pi ft+\beta)+m \quad (3)$$

Fixing values of $\alpha$ and $\beta$ by trial-and-error and solving for k, l and m, we can get many feasible set of orthogonal waveforms. For example, $$\cos(2\pi ft+0°)+0.924$$

$$\cos(2\pi ft+150°)+0.469$$

$$\cos(2\pi ft+250°)+0.185$$

In the above waveforms, degrees must be converted to radians while verifying and plotting.

In an aspect, the present disclosure relates to a method comprising the steps of generating three phase shifted waveforms, and generating three orthogonal waveforms by adding Direct Current (DC) component to each of the three phase shifted waveforms of the same transmission frequency f, wherein the waveforms are sinusoidal or co-sinusoidal. Aspects of the present disclosure aim at providing three orthogonal waveforms that can be used for transmitting or communicating 3n bits (n bits from each waveform) at a given frequency. Use of such three orthogonal waveforms can be used in applications such as QAM to create a 3-dimensional QAM, along with use in other like applications such as in Orthogonal frequency-division multiplexing (OFDM), Quadrature Phase Shift Keying (QPSK), Binary Phase Shift Keying (BPSK), among others. The three orthogonal waveforms can in general be used in any application where complex number algebra is used, and can help increase the transmission capacity by additional 50%.

According to one embodiment, method of the present disclosure includes the step of generating three orthogonal waveforms as $$\cos(\theta)+k, \quad (4)$$

$$\cos(\theta+2\pi/3)+k, \text{ and} \quad (5)$$

$$\cos(\theta+4\pi/3)+k \quad (6),$$

wherein k is the DC component having a value of say 0.5 volts, and $\theta=2\pi ft$ with f being the baseband frequency=1/T with T being Time Period, and t being time.

In an aspect therefore, the present disclosure relates to a method comprising the step of generating three orthogonal waveforms as $\cos(\theta)+k$, $\cos(\theta+2\pi/3)+k$, and $\cos(\theta+4\pi/3)+k$, wherein k represents DC component of the waveforms, and wherein $\theta=2\pi ft$ with f being baseband frequency=1/T, and T being Time Period, and t being time.

In an aspect, the cosine waveforms can be replaced by sine waveforms separated by 120 degrees, and wherein the three orthogonal waveforms can be used for transmitting 3n bits at a given frequency, wherein n bits are transmitted from each waveform. In another aspect, the three orthogonal waveforms can be used in any or a combination of QAM to create a 3-dimensional QAM, Orthogonal frequency-division multiplexing (OFDM) based modulation, Quadrature Phase Shift Keying (QPSK) based modulation, Binary Phase Shift Keying (BPSK) modulation, and a complex number algebra based modulation technique.

In an aspect, the present disclosure further relates to a communication system comprising an input means configured to receive a first input bit stream, a second input bit stream, and a third input bit stream, and a waveform generation means configured to generate three orthogonal waveforms as $\cos(\theta)+k$, $\cos(\theta+2\pi/3)+k$, and $\cos(\theta+4\pi/3)+k$, wherein k represents DC component of the waveforms, and wherein $\theta=2\pi ft$ with f being baseband or passband frequency=1/T, and T being Time Period, and t being time. The system can further include a multiplication means configured to multiply $\cos(\theta)+k$ with first input bit stream to obtain first output, multiply $\cos(\theta+2\pi/3)+k$ with second input bit stream to obtain second output, and multiply $\cos(\theta+4\pi/3)+k$ with third input bit stream to obtain third output, and a transmission means configured to sum the first output, the second output, and the third output to generate a final output to be transmitted by the system on a channel.

Following set of equations prove that the proposed three orthogonal waveforms are orthogonal to each other:

$$\int_0\uparrow 2\pi(\cos(\theta)+k)^2 d\theta=0.75 \quad 1.$$

$$\int_0\uparrow 2\pi(\cos(\theta+2\pi/3)+k)^2 d\theta=0.75 \quad 2.$$

$$\int_0^{\uparrow} 2\pi (\cos(\theta+4\pi/3)+k)^2 d\theta = 0.75 \qquad 3.$$

$$\int_0^{\uparrow} 2\pi (\cos(\theta)+k)(\cos(\theta+2\pi/3)+k) d\theta = 0 \qquad 4.$$

$$\int_0^{\uparrow} 2\pi (\cos(\theta)+k)(\cos(\theta+4\pi/3)+k) d\theta = 0 \qquad 5.$$

$$\int_0^{\uparrow} 2\pi (\cos(\theta+2\pi/3)+k)(\cos(\theta+4\pi/3)+k) d\theta = 0 \qquad 6.$$

FIG. 1 illustrates an exemplary graphical plot 100 showing orthogonality of the proposed waveforms in accordance with an embodiment of the present disclosure. As shown, the waveform 102 represents first wave (1), waveform 104 represents the second wave (2), and waveform 106 represents the third wave (3). Waveform 108, on the other hand, shows multiplication between waveforms 102 and 104, waveform 110 shows multiplication between waveforms 102 and 106, and waveform 112 shows multiplication between waveforms 104 and 106. Finally, waveform 114 shows addition of the waveforms 102, 104, and 106.

Figure 2:
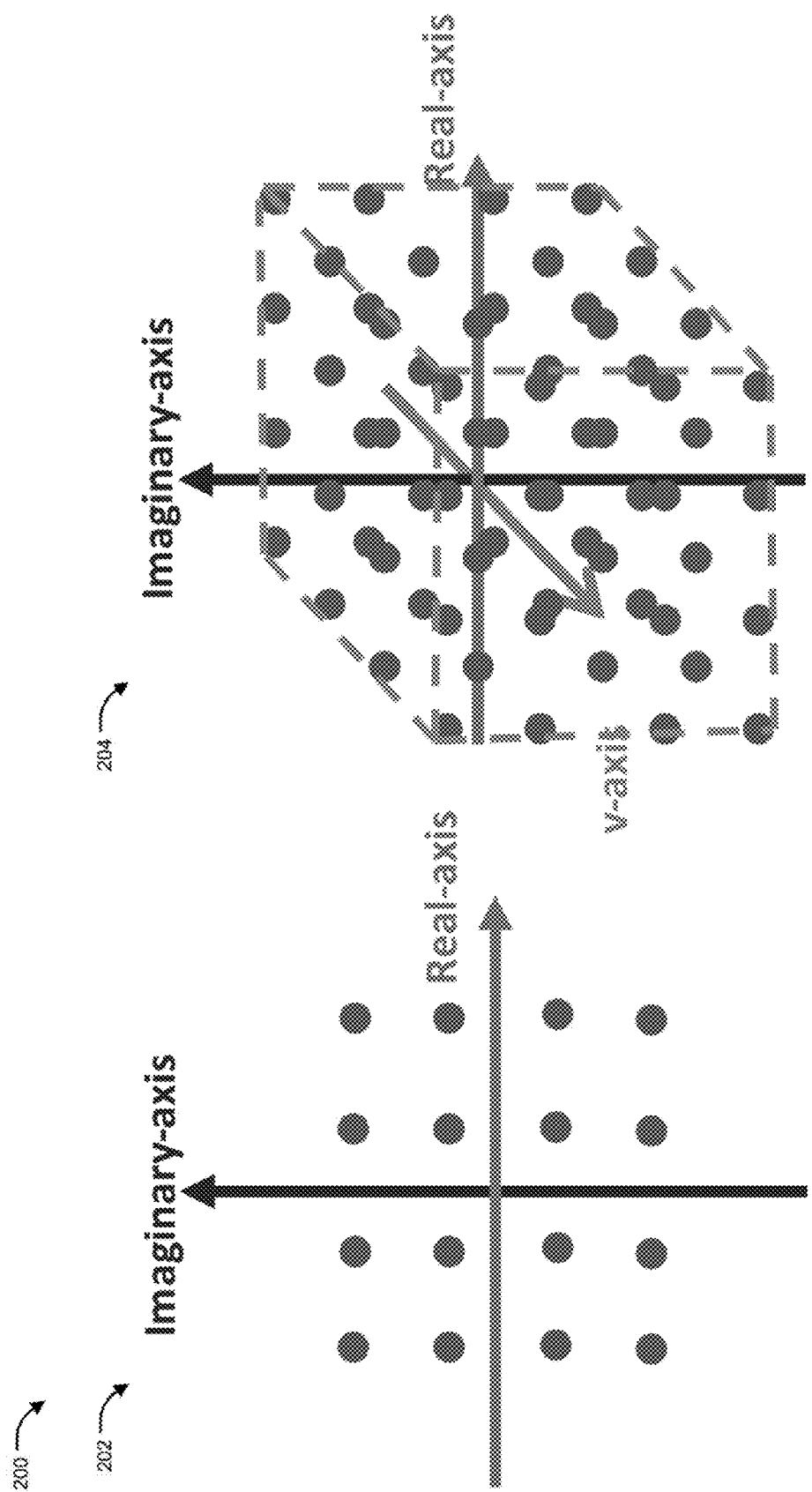
FIG. 2 illustrates an exemplary comparison between representation of 2D and 3D QAM constellation in accordance with an embodiment of the present disclosure.

FIG. 2 illustrates an exemplary comparison 200 between representation of 2D QAM 202 and 3D QAM 204 constellation in accordance with an embodiment of the present disclosure. As can be seen the 3D QAM 204 can be represented along x, y, and z axes, wherein the x-axis, in an exemplary embodiment can represent the real component, the y-axis can represent the imaginary component, and z-axis represents a new virtual axis. As can also be seen, 2D QAM representation 202 can include 16 signal points, 4 in each quadrant, whereas, 3D QAM representation 204 includes 64 (4*4*4) signal points, enabling more bit information being sent from the transmitter to the receiver of a communication system. Obviously, signal points of 3D QAM with n bits per dimension can be equivalently represented using 2D QAM with 1.5n bits per dimension or using 1D PAM with 3n bits along the only available dimension at the expense of increased peak and average energy. Also, 3D QAM with 1 bit per dimension cannot be represented efficiently using 2D QAM or 1D PAM. Therefore not all 3D QAM can be represented in lower dimensional modulation schemes.

Figure 3:
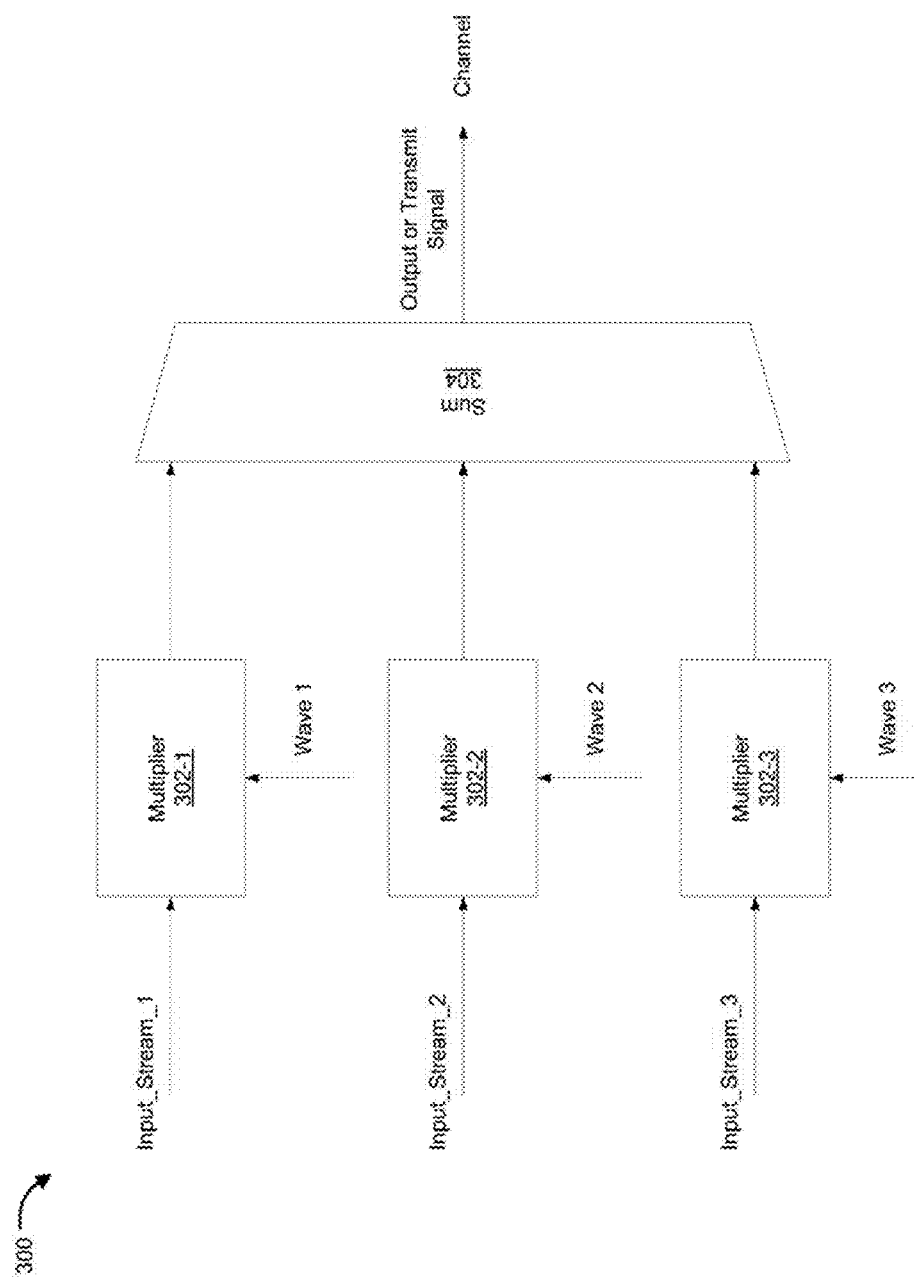
FIG. 3 illustrates an exemplary transmission block of a communication system in accordance with an embodiment of the present disclosure.

FIG. 3 illustrates an exemplary transmission block 300 of a communication system in accordance with an embodiment of the present disclosure. As can be seen, in the proposed system having three orthogonal waveforms, three input streams, each of say n bits can be received at a multiplier (302-1, 302-2, and 302-3, collectively referred to as 302 hereinafter) that multiplies each input stream such as stream_1, stream_2, and stream_3 with one of the three proposed waveforms. In an aspect, the input stream_i can correspond to i'th dimension of QAM signal constellation or ⅓ of the bits to be transmitted.

According to one embodiment, outputs from the three multipliers can be summed at 304 and then transmitted to the receiver through one or more channels.

Figure 4:
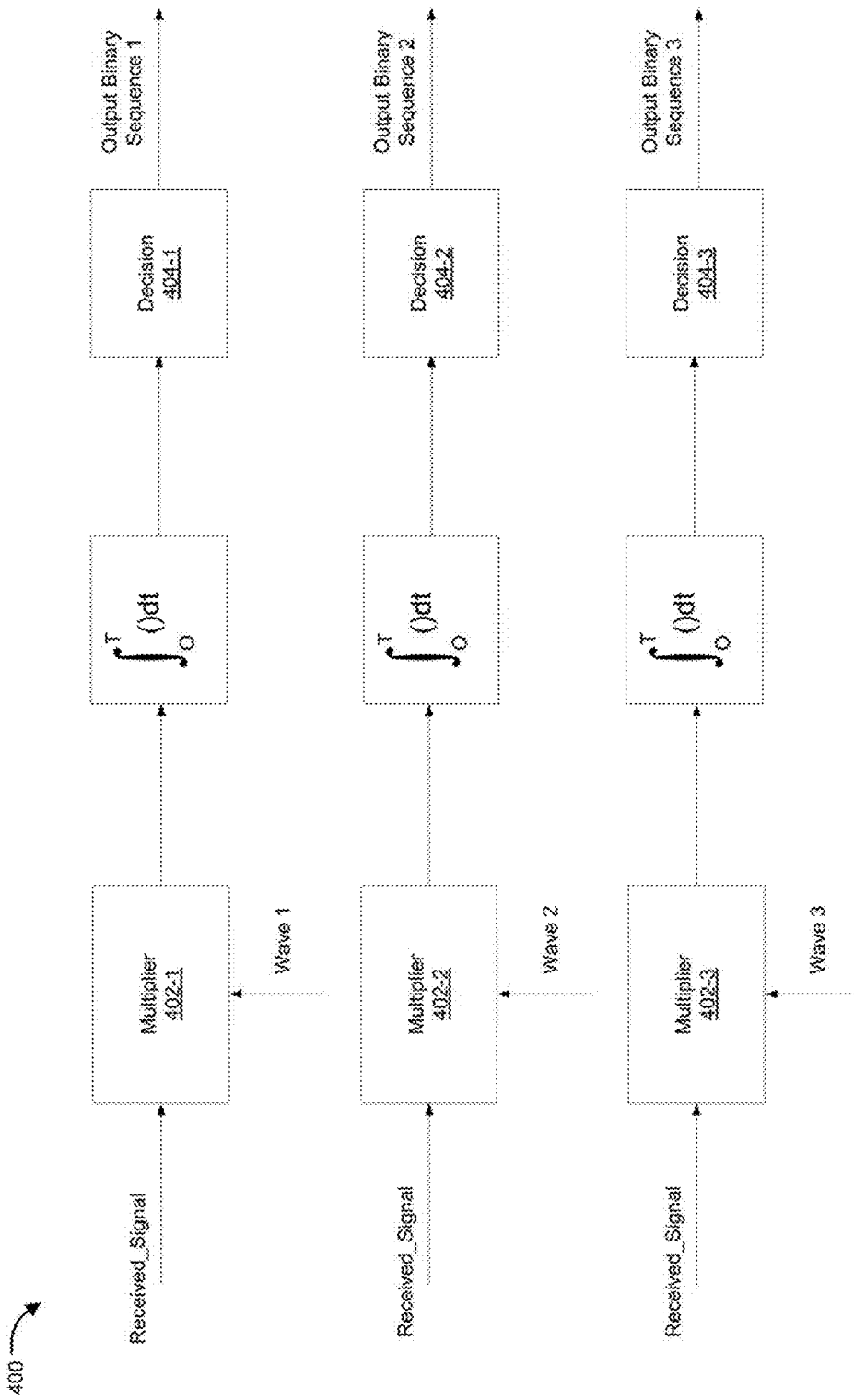
FIG. 4 illustrates an exemplary receiver block of a communication system in accordance with an embodiment of the present disclosure.

FIG. 4 illustrates an exemplary receiver block 400 of a communication system in accordance with an embodiment of the present disclosure. As shown, at the receiver, the same received signal can be received at a multiplier 402-1, 402-2, and 402-3, collectively referred to as receiver multiplier 402 hereinafter, which processes each received signal with one of the three orthogonal waveforms (Wave 1, Wave 2, and Wave 3). According to one embodiment, time, frequency and phase synchronization can be performed before the multiplication step. Post multiplication, outputs from each multiplier 402 can be integrated over a time interval of T, wherein the output from each integrator can be compared with a set of threshold values say $V_{th}$ at the decision blocks 404-1, 404-2, and 404-3. For instance, if the output is more than $V_{th}$, the decision can be made in favor of symbol 1, else the decision can be made in favor of symbol 0.

One should appreciate the present disclosure is not limited to QAM in any manner. One should also appreciate that off the shelf components including but not limited to de-multiplexer, multiplexer, correlator, decision device, multiplier, and integrator can be incorporated.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. Within the context of this document terms "coupled to" and "coupled with" are also used euphemistically to mean "communicatively coupled with" over a network, where two or more devices are able to exchange data with each other over the network, possibly via one or more intermediary device.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc. The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claim.

The present disclosure provides a mechanism/system that enables sending of more bits per unit of transmission time interval.

The present disclosure provides a mechanism/system that provides three orthogonal waveforms that can be used for transmitting 3n bits (n bits from each waveform) at a given frequency.

The present disclosure provides a mechanism/system that provides three orthogonal waveforms to enable use of such three orthogonal waveforms in applications such as QAM to create a 3-dimensional QAM, along with use in other like applications such as in Orthogonal frequency-division multiplexing (OFDM), Quadrature Phase Shift Keying (QPSK), Binary Phase Shift Keying (BPSK), among others.

The present disclosure provides a mechanism/system that provides three orthogonal waveforms to enable implementation in applications where complex number algebra is used, which can help increase the transmission capacity by additional 50%.

What is claimed is:

1. A method of transmitting bit information from a transmitter of a transmission system to a receiver, said method comprising the steps of:
   receiving, at the transmitter, the bit information to be transmitted to the receiver;
   generating, at the transmitter, three phase shifted waveforms;
   generating, at the transmitter, three orthogonal waveforms by adding Direct Current (DC) component to each of the three phase shifted waveforms of the same transmission frequency f, wherein the three phase shifted waveforms are sinusoidal or co-sinusoidal, wherein the three orthogonal waveforms are used for transmitting 3n bits at a given frequency, wherein n bits are transmitted from each orthogonal waveform; and wherein n is an integer; and
   transmitting, from the transmitter, to the receiver, the bit information using the three orthogonal waveforms.

2. The method of claim 1, wherein the three orthogonal waveforms are $\cos(\theta)+k$, $\cos(\theta+2\pi/3)+k$, and $\cos(\theta+4\pi/3)+k$, and wherein k represents DC component of the waveforms, and wherein $\theta=2\pi ft$ with f being frequency=1/T, and T being Time Period, and t being time.

3. The method of claim 2, wherein the value of k is equal to 0.5 volts.

4. The method of claim 1, wherein the three orthogonal waveforms are used in any or a combination of QAM to create a 3-dimensional QAM, Orthogonal frequency-division multiplexing (OFDM) based modulation, Quadrature Phase Shift Keying (QPSK) based modulation, Binary Phase Shift Keying (BPSK) modulation, and a complex number algebra based modulation technique.

5. The method of claim 1, wherein the three orthogonal waveforms are used to create a 3-dimensional QAM, wherein the 3-dimensional QAM is represented along x, y, and z axes, wherein the x-axis represents real component, y-axis represents imaginary component, and z-axis represents a new virtual axis.

6. A communication system comprising:
   a transmitter configured to receive a first input bit stream, a second input bit stream, and a third input bit stream;
   the transmitter configured to generate three orthogonal waveforms as $\cos(\theta)+k$, $\cos(\theta+2\pi/3)+k$, and $\cos(\theta+4\eta/3)+k$, wherein k represents DC component of the waveforms, and wherein $\theta=2\pi ft$ with f being frequency=1/T, and T being Time Period, and t being time;
   the transmitter configured to multiply $\cos(\theta)+k$ with first input bit stream to obtain first output, multiply $\cos(\theta+2\pi/3)+k$ with second input bit stream to obtain second output, and multiply $\cos(\theta+4\pi/3)+k$ with third input bit stream to obtain third output; and
   the transmitter configured to sum the first output, the second output, and the third output to generate a final output to a receiver on a channel.

7. The system of claim 6, wherein any or a combination of time, frequency and phase synchronization is performed before the multiplication.

8. The system of claim 6, wherein, at the receiver, the final output is multiplied using the three orthogonal waveforms, and post the multiplication at the receiver, the first output, the second output, and the third output are integrated over T using an integrator to obtain first integrated output, second integrated output, and third integrated output, wherein the first integrated output, the second integrated output, and the third integrated output are compared with a set of threshold values at respective decision blocks to obtain a decision in favor of symbol 1 or in favor of symbol 0.

9. The system of claim 8, wherein the decision, at the receiver, is made in favor of symbol 1 when the integrated output is greater than respective threshold value.

\* \* \* \* \*